March 23, 1937.    H. C. BOWEN    2,074,362
FLUID PRESSURE ACTUATED MOTOR
Filed Dec. 14, 1935

INVENTOR.
HERBERT C. BOWEN
BY
ATTORNEYS.

Patented Mar. 23, 1937

2,074,362

UNITED STATES PATENT OFFICE 2,074,362

FLUID PRESSURE ACTUATED MOTOR

Herbert C. Bowen, Detroit, Mich., assignor to Hydraulic Brake Company, Detroit, Mich., a corporation of California Application December 14, 1935, Serial No. 54,524

4 Claims. (Cl. 60—54.6)

This invention relates to brakes, and more particularly to motors for actuating the friction elements of brakes.

Heretofore fluid pressure actuated motors having opposed flexible cups or diaphragms provided with rims or marginal flanges clamped between opposed shoulders, at least one of which is adjustable, have not proved entirely satisfactory because the material, generally rubber, from which such cups or diaphragms are made is noncompressible. Accordingly, when the cups or diaphragms are clasped in position, portions of the rims or marginal flanges are displaced with the result that the pistons of the motors cooperating with the cups or diaphragms are gripped by the displaced portions of the rims or flanges to such an extent as to inhibit smooth operation of the motors. The present invention aims to overcome this objection.

An object of the invention is to provide a fluid pressure actuated motor including a cylinder, opposed pistons reciprocable in the cylinder, flexible cups for inhibiting seepage of fluid from the cylinder past the pistons, and means for retaining the cups in position without distortion.

Another object of the invention is to provide a fluid pressure actuated motor including a cylinder, opposed pistons reciprocable in the cylinder, flexible cups or diaphragms seated on annular shoulders in the cylinder to inhibit the seepage of fluid past the pistons, and means for retaining the cups or diaphragms on the shoulders without distorting any portion of the cups.

A feature of the invention is a flexible cup including a rim having a marginal flange or lip and a central dome forming in conjunction with the rim or flange a continuous groove providing a seat for a spring.

A still further feature of the invention is to provide a flexible cup for a fluid pressure actuated motor having the advantages of a positive seal, entirely efficient in operation, and yet of such marked simplicity that its manufacture may be economically facilitated.

The above and other objects and features of the invention including various desirable details of the invention will be apparent from the following description of the embodiment of the invention illustrated in the accompanying drawing, in which,—

Figure 1:
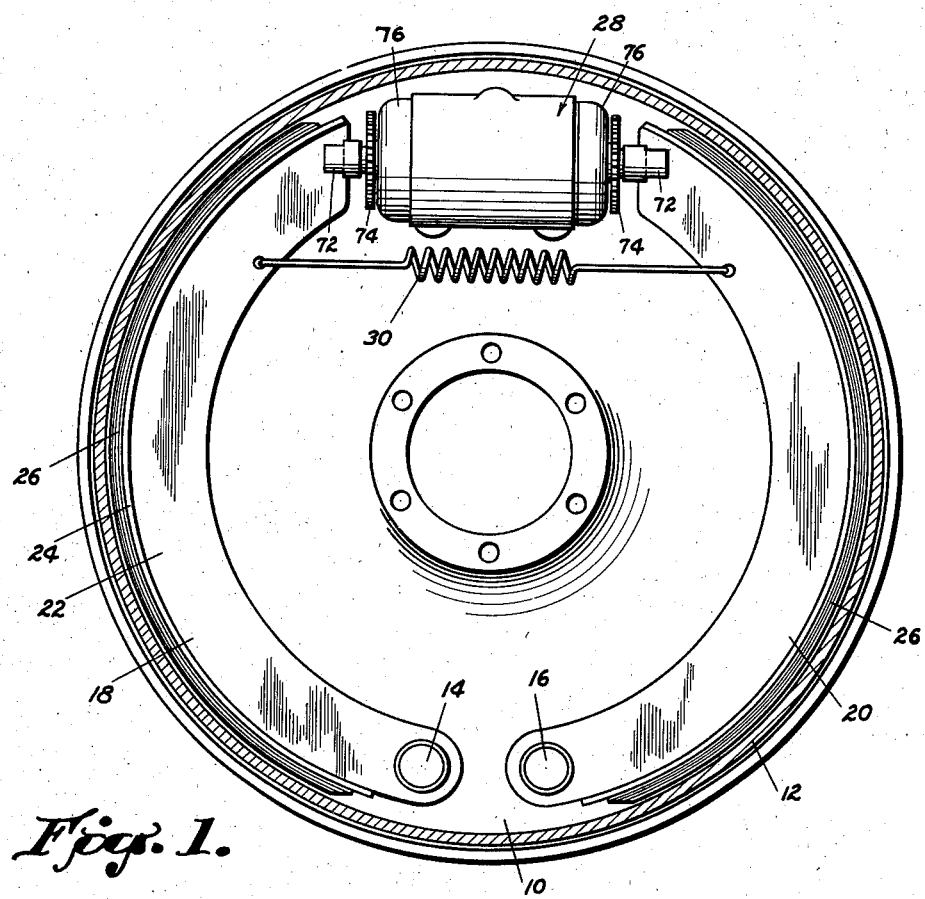
Figure 2:
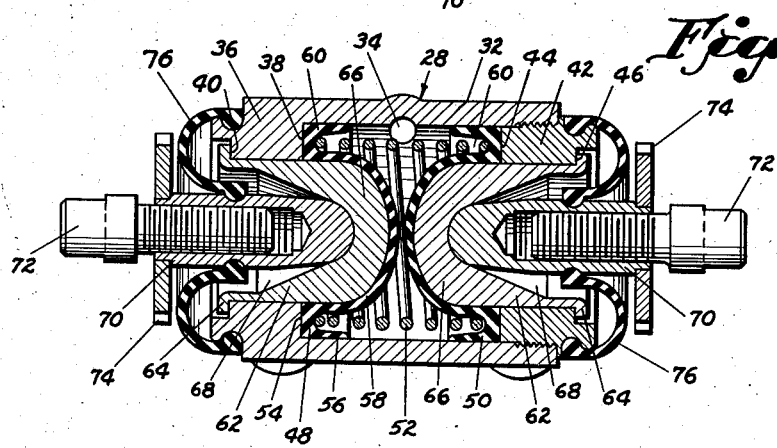

Fig. 1 is a vertical sectional view of a brake structure embodying the invention; and Fig. 2 is an enlarged longitudinal sectional view of the motor for actuating the friction elements of the brake.

Referring to the drawing for more specific details of the invention, 10 represents a fixed support or backing plate which may be suitably secured to an axle or to an axle housing of a motor vehicle, and 12 receives a rotatable drum associated with the backing plate. The drum is preferably of conventional type, provided with means by which it may be secured to a wheel of the vehicle.

Corresponding anchors 14 and 16 are arranged on the backing plate adjacent one another, and like interchangeable friction elements or shoes 18 and 20 have their articulate ends pivoted on the anchors. Preferably each of the shoes includes a web 22 supporting a rim 24, to which is suitably secured a friction lining 26 adaptable for cooperation with the drum 12; and a fluid pressure actuated motor 28 secured to the backing plate 10 between the separable ends of the shoes 18 and 20 is operative to spread the shoes into engagement with the drums 12 against the resistance of a retractile spring 30 connecting the shoes.

The fluid pressure actuated motor 28 includes a cylinder 32 open at both ends and provided with a centralized port 34 which may be connected to any suitable fluid pressure producing means. The cylinder is also provided with the usual bleeder port controlled by a valve, not shown.

One end of the cylinder has a section 36 of reduced diameter providing an internal annular shoulder 38 and an external annular shoulder 40; and the other end of the cylinder has threaded therein a relatively heavy sleeve 42 providing an internal annular shoulder 44. The inner diameter of the sleeve corresponds to the diameter of the reduced section 36 of the cylinder, and the sleeve has an external annular shoulder 46 corresponding to the external annular shoulder 40 of the cylinder.

Corresponding oppositely disposed flexible cups 48 and 50 are seated on the annular shoulders 38 and 44, and a spring 52 interposed between the cups 48 and 50 retains them against displacement. As shown, each of the cups includes a relatively heavy annular base or rim 54 having a marginal flange or lip 56 adapted to fit snugly against the wall of the cylinder, and a central dome portion 58 provides in conjunction with the lip a continuous groove 60 for the reception of the spring 52.

Corresponding opposed pistons 62, reciprocable in the reduced section 36 of the cylinder and the sleeve 42 respectively, have on their skirts circumferential flanges 64 adapted to abut the shoulders 40 and 46 so as to limit the movement of the pistons toward one another. The heads of the pistons are rounded as indicated at 66 to conform to the contour of the dome portions 58 of the cups. In the back of the pistons are recesses 68 for the reception of adjustable rods including pins 70 seated in the recesses and studs 72 threaded axially in the pins, and the studs are connected respectively to the respective shoes 18 and 20. The pins have thereon thumb wheels 74 by which the pins may be rotated so as to adjust the overall length of the rod, and flexible dust shields 76 connect the pins to the open ends of the cylinder for the exclusion of dust and other foreign substances.

In operation, energization of the motor 28 is accomplished by the introduction of fluid under pressure to the cylinder 32 of ample volume to create pressure in the cylinder of sufficient magnitude to actuate the pistons 62. The pressure in the cylinder 32 is imposed on the cups 48 and 50, the rims of which are held on the opposed shoulders 38 and 44 by the spring 52 interposed between the cups. These rims are relatively heavy, and because of this they are in no way affected by the pressure. However, the pressure forces the lips 56 of the cups tightly against the wall of the cylinder to inhibit the seepage of fluid from the cylinder and also acts upon the flexible dome portions 58 of the cups resulting in movement of the pistons 62 in opposite directions with the consequent movement of the shoes 18 and 20 into engagement with the drum against the resistance of the retractile spring 30. Upon release of pressure in the cylinder 32, fluid is expelled therefrom and the shoes 18 and 20 are returned to their normal positions under the influence of the retractile spring 30.

When the pistons return to their normal or retracted positions, the flanges 64 on the respective skirts of the pistons abut the shoulders 40 and 46 respectively so that the rounded ends 66 of the pistons 62 seat in the dome portions 58 of the cups 48 and 50 without stretching or in any way distorting these portions. Accordingly, it will be clearly understood that the domes of the cups are at no time stretched nor are any other portions of the cups placed under stresses and strains tending to cause injury thereto. Therefore, the life of the cups is greatly enhanced and the possibility of binding the pistons is avoided.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,—

1. A fluid pressure actuated motor comprising a cylinder having an internal shoulder, a flexible cup seated on the shoulder having a central dome and a marginal flange providing a continuous groove, a spring seated in the groove for retaining the cup against displacement, and a piston reciprocable in the cylinder having its head seated in the dome.

2. A fluid pressure actuated motor comprising a cylinder having an internal shoulder, a flexible cup having a rim seated on the shoulder, a central dome, a marginal flange forming in conjunction with the dome a continuous groove, a spring seated in the groove retaining the cup against displacement, and a piston reciprocable in the cylinder having its head in the dome.

3. A fluid pressure actuated motor comprising a cylinder, opposed annular shoulders in the cylinder, flexible cups having rims seated on the shoulder, said cups having central domes and marginal flanges forming in conjunction with the domes continuous grooves, a spring interposed between the cups having its end seated in the grooves, and pistons reciprocable in the cylinder having their heads seated in the domes.

4. A fluid pressure actuated motor comprising a cylinder having shoulders in one end thereof, a sleeve threaded in the other end of the cylinder providing an opposed shoulder, flexible cups having rims seated on the shoulders, said cups having central domes and marginal flanges engaging the wall of the cylinder and forming in conjunction with the domes continuous grooves, a spring interposed between the cups having its ends seated in the grooves, oppositely disposed pistons reciprocable in the cylinder having their heads seated in the domes, and stops for limiting the movement of the pistons toward one another.

HERBERT C. BOWEN.